US009055377B2

(12) United States Patent
Kinsbergen et al.

(10) Patent No.: US 9,055,377 B2
(45) Date of Patent: Jun. 9, 2015

(54) PERSONAL COMMUNICATION DEVICE WITH HEARING SUPPORT AND METHOD FOR PROVIDING THE SAME

(75) Inventors: Jacques Kinsbergen, Boechout (BE); Frans Erwin Offeciers, Antwerpen (BE); Andrzej Zarowski, Wilrijk (BE); Joachim Neumann, Barcelona (ES); Andreas Beisler, Barcelona (ES); Amaury Hazan, Barcelona (ES); Nicolas Wack, Barcelona (ES)

(73) Assignee: JACOTI BVBA, Boechout (BE)

( * ) Notice: Subject to any disclaimer, the term of this patent is extended or adjusted under 35 U.S.C. 154(b) by 26 days.

(21) Appl. No.: 13/988,102

(22) PCT Filed: Nov. 21, 2011

(86) PCT No.: PCT/EP2011/070606
§ 371 (c)(1),
(2), (4) Date: May 17, 2013

(87) PCT Pub. No.: WO2012/066149
PCT Pub. Date: May 24, 2012

(65) Prior Publication Data
US 2013/0243227 A1    Sep. 19, 2013

Related U.S. Application Data

(60) Provisional application No. 61/415,521, filed on Nov. 19, 2010.

(30) Foreign Application Priority Data

May 6, 2011    (EP) .................................... 11165098

(51) Int. Cl.
*H04R 25/00*    (2006.01)
*H04M 1/247*    (2006.01)
(Continued)

(52) U.S. Cl.
CPC ............. *H04R 25/50* (2013.01); *H04M 1/2155* (2013.01); *H04M 1/2475* (2013.01);
(Continued)

(58) Field of Classification Search
CPC ...... H04R 25/00; H04R 25/30; H04R 25/305; H04R 25/50; H04R 25/55; H04R 25/556; H04R 25/558; H04R 2225/00; H04R 2225/39; H04R 2225/41; H04R 2225/43; H04R 2225/55; H04R 2225/61; H04R 2460/03; H04R 2460/07
USPC ......... 381/312, 314, 315, 316, 323, 324, 328, 381/326
See application file for complete search history.

(56) References Cited

U.S. PATENT DOCUMENTS 5,892,836 A *    4/1999    Ishige et al. .................. 381/316
6,944,474 B2     9/2005    Rader et al.
(Continued)

FOREIGN PATENT DOCUMENTS

EP    1 379 103 A2    1/2004
EP    1 471 767 A2    10/2004
(Continued)

OTHER PUBLICATIONS

International Search Report issued in PCT/EP2011/070606, Mar. 28, 2012.
(Continued)

*Primary Examiner* — Paul S Kim
*Assistant Examiner* — Sabrina Diaz
(74) *Attorney, Agent, or Firm* — Workman Nydegger

(57) ABSTRACT

A personal communication device provides hearing support, and includes an input receiving an audio signal, a programmable processor, and an output outputting the processed signal. The programmable processor performs a filtering operation on a digital version of the audio signal in a first signal path based on parameter settings and provides control logic that determines the parameter settings based on information on user preferences, on audiological information and on information on the listening situation to provide hearing loss compensation. The programmable processor has a second signal path in parallel with the first signal path that receives the digital version of the audio signal and parameter settings and determining the filter coefficients of the filtering operation based on the parameter settings and the digital version of the audio signal.

24 Claims, 8 Drawing Sheets

(51) Int. Cl.
*H04M 1/60* (2006.01)
*H04M 1/725* (2006.01)
*H04M 1/215* (2006.01)
*H04R 27/00* (2006.01)

(52) U.S. Cl.
CPC ....... *H04M 1/6016* (2013.01); *H04M 1/72591* (2013.01); *H04R 25/70* (2013.01); *H04R 2225/41* (2013.01); *H04R 27/00* (2013.01)

(56) References Cited

U.S. PATENT DOCUMENTS

| | | | |
|---|---|---|---|
| 7,529,545 | B2 | 5/2009 | Rader et al. |
| 7,796,770 | B2 * | 9/2010 | Reber et al. .................. 381/320 |
| 7,889,879 | B2 * | 2/2011 | Dillon et al. .................. 381/314 |
| 8,107,657 | B2 * | 1/2012 | Hansen .......................... 381/317 |
| 8,300,861 | B2 * | 10/2012 | Pontoppidan ................. 381/313 |
| 2005/0135644 | A1 | 6/2005 | Qi |
| 2005/0283263 | A1 * | 12/2005 | Eaton et al. ..................... 700/94 |
| 2006/0159285 | A1 * | 7/2006 | Reber et al. ..................... 381/98 |
| 2007/0098115 | A1 | 5/2007 | Bachl et al. |
| 2009/0074206 | A1 | 3/2009 | Bradford et al. |
| 2010/0198899 | A1 * | 8/2010 | Dickson et al. ............... 708/322 |

FOREIGN PATENT DOCUMENTS

| | | |
|---|---|---|
| EP | 1 513 371 | 3/2005 |
| EP | 1 708 543 A1 | 10/2006 |
| WO | 03/098970 A1 | 11/2003 |
| WO | 2008/000842 A2 | 1/2008 |

OTHER PUBLICATIONS

International Preliminary Report on Patentability issued in PCT/EP2011/070606, Feb. 20, 2013.

* cited by examiner

PERSONAL COMMUNICATION DEVICE WITH HEARING SUPPORT AND METHOD FOR PROVIDING THE SAME

FIELD OF THE INVENTION

The present invention is generally related to the field of personal communication devices adapted to provide the functionality of digital hearing aids, bone conduction implants, middle ear implants or cochlear implants or combinations thereof.

BACKGROUND OF THE INVENTION

Hearing loss characteristics are highly individual and hearing thresholds vary substantially from person to person. The hearing loss varies from frequency to frequency, which is reflected by the clinical audiogram. Depending on the type and severity of hearing loss (sensorineural, conductive or mixed; light, moderate, severe or profound), the sound processing features of the human ear are compromised in different ways and require different types of functional intervention, from simple amplification of incoming sound as in conductive hearing losses to more sophisticated sound processing and/or using non-acoustic transducers as in the case of profound sensorineural hearing losses. Classical hearing aids capture incoming acoustic signals, amplify them and output the signal through a loudspeaker placed in the external ear channel. In conductive and mixed hearing losses an alternative stimulation pathway through bone conduction or direct driving of the ossicular chain or the inner ear fluids can be applied and the classical hearing aids may be replaced by alternative bone conductive implants or middle ear implants. Bone conductive implants aids resemble conventional acoustic hearing aids, but transmit the sound signal through a vibrator to the skull of the hearing impaired user. Middle ear implants use mechanical transducers to directly stimulate the middle or the inner ear. In sensorineural hearing losses deficits in sound processing in the inner ear result in an altered perception of loudness and decreased frequency resolution. To compensate for the changes in loudness perception, for example less amplification is needed for high-level sounds than for low-level sounds. The core functionality of hearing aids in sensorineural hearing losses is thus (a) compensating for the sensitivity loss of the impaired human ear by providing the needed amount of amplification at each frequency and (b) compensating for loudness recruitment by means of a situation dependent amplification. In profound sensorineural hearing losses the only functional solution for the patients can be offered by cochlear implants (CI). Cochlear implants provide electric stimulation to the receptors and nerves in the human inner ear. In the signal processing chain of a cochlear implant, the signal that is picked up by the microphone is processed in a similar fashion as in a hearing aid. A second stage then transforms the optimized sound signal into an excitation pattern for the implanted stimulator. The implanted stimulator comprises electrical current sources that drive the electrodes, which are surgically implanted into the cochlea to directly stimulate the auditory nerve. Totally implantable cochlear implants (TICI) include an implantable microphone, a rechargeable battery and a speech processor with no visible components at the head of the hearing impaired user.

FIG. 1 represents a schematic diagram of a conventional digital hearing aid, comprising a microphone, an analogue-to-digital signal converter, a digital signal processor, a digital-to-analogue converter and a speaker. FIG. 1 also represents bone conductive implants and middle ear implants, except for the nature of the acoustic transducer. The solid arrows in FIG. 1 show the flow of the audio signal between the modules. FIG. 2 shows a scheme of a conventional cochlear implant with the external ear-worn unit, that is typically worn behind the ear, composed of a microphone, an analogue-to-digital signal converter, a digital signal processor doing hearing aid-like signal preprocessing and a modulator unit that creates the excitation patterns of the electrodes in the cochlear implant and prepares the signal for transcutaneous transmission by modulation. The audio signal flow in these devices is shown by the solid arrows. The figure also shows the parts implanted into the head of the hearing impaired. Here, the signal from the external unit is demodulated and the impaired inner ear is stimulated through the implanted electrodes, as indicated by the dashed arrow. The transportation through the skin of the user is wireless. Thetotally implantable cochlear implant is composed of all components shown in FIG. 2, except for the modulation and demodulation modules, which are not needed in a totally implanted device.

The core task of the signal processing of hearing aids and an important part in the signal pre-processing of other hearing support systems comprises frequency-equalization filtering and amplification, as well as automatic gain control to provide the appropriate amount of loudness perception in all listening situations. In addition to these core tasks, the signal processing can provide noise reduction, feedback reduction, sound quality enhancements, speech intelligibility enhancements, improved signal-to-noise ratio of sounds from specific directions (directional microphones, beam forming) and more.

Hearing aids and other hearing solutions need to adapt their amplification not only to the individual hearing loss of the patient, but they also need to be able to adapt the amount of amplification to the current sound environment. This is related to the phenomenon of loudness recruitment that is characteristic for sensorineural hearing losses. As a result of loudness recruitment, more amplification is required in soft listening situations and less amplification is required in loud listening situations. A slow adaptation of the amount of amplification to the sound environment, with time constants larger than 1 second, is called "automatic volume control". This type of adaptation has the advantage to give the correct amount of amplification without distorting the signal: it results in a high sound quality. However, abrupt changes in the level of the input signal are not compensated for and can in same cases result in a painful sensation or in the loss of important information that follows a loud event. Examples of abrupt changes could be sudden loud sounds (door bang), but they also occur when listening to two people talking simultaneously and one of the two persons being closer than the other. The state-of-the-art approach to compensate for sudden changes in the input signal level is an "automatic gain control" system that uses short time constants. However, these fast changes of the signal amplitude cause a reduction of the audio quality.

Several drawbacks of prior art hearing aids and cochlear implants can be indicated. Hearing aids are often unattractive and associated with age and handicaps. (This social phenomenon is often referred to as 'stigmatization'.) Even with the latest improvements of less visible devices, amongst the hearing impaired that both need and can afford hearing aids, the market penetration is around 25%. Another drawback of prior art technology is that due to the necessity of custom hardware and custom chip development, both hearing aids and cochlear implants are quite pricy. Furthermore, hearing aids require specialized experts for parameter adjustments (hearing aid fitting). This fitting is typically performed by trained professionals like audiologists or ENT (ear, nose and throat) doctors on a PC with dedicated fitting software, which is normally provided by the manufacturer of the corresponding devices. Specialized expert knowledge is indeed required to correctly adjust the parameters. This is even more true in the case of cochlear implants. The adjustments of the hearing professional can be based on objective audiological measurements, e.g. an audiogram, or on subjective feedback from the user. In the case of cochlear implants, the need for professional support and hearing training is especially extensive. Hearing impaired customers have to visit an audiological clinic for servicing of their device and even simple software adjustments require a personal visit.

Another drawback of prior art technology is that digital hearing aids and cochlear implants only allow a very limited number of manual adjustments by the hearing impaired person himself, the output volume control and in some cases the selection of one of a small number of pre-defined listening programs. Each of these programs comprises a set of parameters optimized for a specific listening situation. In some cases, hearing aids can be controlled by a physical remote control (a hand held device or a wrist watch with remote control functionality), but the number of parameters that can be changed by these remote controls is limited.

Another drawback of prior art hearing aids and cochlear implants is that solutions to connect these devices to consumer electronics (TV, stereo, MP3 player, mobile phones) are cumbersome and expensive. Furthermore, hearing aids do not have a connection to the Internet and their interaction with Personal Digital Assistant (PDA) devices and mobile phones is typically limited to the amplification of the voice signal during phone calls or the amplification of reproduced music. The software (firmware) that runs in hearing aids is normally not upgradable. For a small number of products, firmware updates may be available, but these updates are not done on a frequent basis and therefore, changes in the signal processing are in most cases limited to parameter-based changes that have been anticipated when the device was built.

The newest generation of state-of-the-art digital devices can allow for a simple communication between the devices at the left and right ear. However, this communication is limited to a low bit rate transfer of parameters, for example to synchronize parameters of the automatic gain control to avoid hampering with the spatial perception due to independent gains in the two instruments. More advanced approaches that require access to the audio signal from the microphones at the left and right ear are not feasible with current technology.

The upper limit of the frequency range of state-of-the-art hearing aids is typically 8 kHz. Also, only a small number of hearing aids allow for a very simple form of usage monitoring to determine the duration of hearing aid usage. Finally, hearing aids do not monitor hearing loss degradation, except when used as part of a hearing test, and hearing aids are limited in their ability to provide tinnitus masking above 8 kHz.

Several prior art documents have already tackled one or more of the above-mentioned problems. For example, US2009/074206 A1 is concerned with a method of enhancing sound for hearing impaired individuals. A portable assistive listening system is disclosed for enhancing sound, including a fully functional hearing aid and a separate handheld digital signal processing device. The device contains a programmable DSP, an ultra-wide band (UWB) transceiver for communication with the hearing aid and a user input device. By supplementing the audio processing functions of the hearing aid with a separate DSP device (containing more processing power, memory, . . . ) the usability and overall functionality of hearing devices can be enhanced. The proposed solution still requires a hearing aid to provide hearing loss compensation.

Application US2007/098115 relates to a wireless hearing aid system and method that incorporates a traditional wireless transceiver headset and additional directional microphones to permit extension of the headset as a hearing aid. The proposed solution contains a mode selector and programmable audio filter so that the headset can be programmed with a variety of hearing aid settings that may be downloaded via the Internet or tailored to the hearing impairment of the patient. No flexible means are available to easily adjust the signal processing parameters.

Also patent documents U.S. Pat. No. 6,944,474 and U.S. Pat. No. 7,529,545 mainly focus on hearing profiles. They propose a mobile phone including resources applying measures of an individual's hearing profile, a personal choice profile and induced hearing loss profile (which takes into account the environmental noise), separately or in combination, to build the basis of sound enhancement. The sound input in these documents is either a speech signal from a phone call, an audio signal that is being received through a wireless link to a computer or some multimedia content stored on the phone. While the sound environment is taken into account to optimize the perception of these sound sources, the sound environment itself is not the target signal. In contrast, the amplification is optimized in order to reduce the masking effect of the environmental sounds.

In application US2005/135644 a digital cell phone is described with built-in hearing aid functionality. The device comprises a digital signal processor and a hearing loss compensation module for processing digital data in accordance with a hearing loss compensation algorithm. The hearing loss compensation module can be implemented as a program executed by a microprocessor. The proposed solution also exploits the superior performance in terms of processing speed and memory of the digital cell phone as compared to a hearing aid. The wireless download capabilities of digital cell phones are said to provide flexibility to the control and implementation of hearing aid functions. In an embodiment the hearing compensation circuit provides level-dependent gains at frequencies where hearing loss is prominent. The incoming digitized signal is processed by a digital filter bank, whereby the received signals are split into different frequency bands. Each filter in the filter bank possesses an adequate amount of stop-band attenuation. Additionally, each filter exhibits a small time delay so that it does not interfere too much with normal speech perception (dispersion) and production. The use of a hierarchical, interpolated finite impulse response filter bank is proposed. The outputs of the filter bank serve as inputs to a non-linear gain table or compression module. The outputs of the gain table are added together in a summer circuit. A volume control circuit may be provided allowing interactive adjustment of the overall signal level. Note that in the proposed system the audio signal captured during a phone call is used as the main input.

SUMMARY OF THE INVENTION

It is an object of embodiments of the present invention to provide a low-cost general-purpose personal communication device equipped for compensating hearing loss, which introduces a minimal signal delay and offers a lot of flexibility for changing parameters. The invention also aims to provide a method for transforming a general-purpose personal communication device into a device capable of compensating hearing loss.

The above objective is accomplished by a communication device according to the present invention. The communication device, different from a conventional digital hearing aid, has been expanded from a general-purpose consumer communication device to a personal communication device capable of providing hearing support. The personal communication device comprises an input for receiving an audio signal, A/D conversion means for digitizing the audio signal, programmable processing means, D/A conversion for converting the processed digitised audio signal and an output for outputting the D/A converted signal. The programmable processing means is arranged, i.e. programmable, for performing a filtering operation on the digital version of the applied audio signal in a first signal path, the filtering being based on parameter settings. The programmable processing means is further arranged for providing control logic for determining said parameter settings based on information on user preferences and on information on the listening situation, in which the personal communication device is used, obtained via sound environment analysis of the received audio signal and/or via information obtained from sensing means of the personal communication device. Most preferably also audiological information based on the audiogram and other audiological measurements as well as the adjustments during an interactive fitting session, is taken into account when determining the parameter settings. As a result the programmable processing means is actually operable as a hearing loss compensation module arranged for outputting a hearing loss compensated signal. This signal can be presented acoustically, it can be transformed by a cochlear implant into an excitation pattern or it can comprise the excitation pattern.

The programmable processing means has a second signal path in parallel with the first signal path, whereby the second signal path comprises a module for filter transfer function calculation arranged for receiving the digital version of the audio signal and the parameter settings and for determining the filter coefficients of the filtering means based on the parameter settings and the digital audio signal.

The communication device with digital signal processing means as described indeed achieves the goal of low signal latency. The core signal path in the proposed solution contains a single filter that is adapted to the required frequency shaping as reflected in the parameter settings, which have been determined taking into account user preferences, information related to the actual situation wherein the personal communication device is being used and preferably also settings according to expert information provided by a hearing aid professional, e.g. an audiologist. The introduced signal delay is only that of the single filter.

Also the aim of changing parameters in a flexible fashion is achieved: the proposed invention allows adapting parameters in software by an expert or audiologist. Certain parameter settings can be modified by the hearing impaired user. Further, the control logic has been so arranged that information on the listening situation of the device can be used to dynamically and automatically change parameter settings.

In one embodiment the module for transfer function calculation is arranged for actually calculating the filter coefficients of the filtering means. Alternatively, the module for transfer function calculation is arranged for selecting a filter coefficient set among a plurality of predesigned filter coefficient sets, whereby said selected filter coefficient set best matches (e.g. in a least squares sense) the calculated transfer function. An important advantage of the latter embodiment is that the filter design does not need to be executed during usage; a redesign of the filters is required only when the setting of a relevant parameter has been changed, for example when the device is fitted to the individual amplification need.

In this embodiment the personal communication device advantageously comprises storage means for storing the set of predesigned filters. It is further to be noted that the selection of a different set of filter coefficients is required each time the characteristics of the input signal (e.g., its sound level) have changed.

In another advantageous embodiment the personal communication device further comprises a multiplication unit for multiplying the signal output by the filtering means with a value determined in the module for transfer function calculation.

In a preferred embodiment of the invention the module for transfer function calculation is arranged for providing level detection as a weighted sum between a first and a second level detector, whereby the first level detector has a smaller time constant than the second level detector and whereby the respective weight factors w and 1−w of the first and second level detector depend on the difference in level detected between the first and second level detector.

In another embodiment the programmable processing means is further arranged for reducing audible artefacts that can be created while switching from one filter to another by adapting the frequency with which said settings of the filtering means are switched or by interpolating the filter coefficients or by interpolating or by cross-fading between the signal that has been filtered with the old filter and the signal that is filtered by the new filter.

Preferably the programmable processing means is arranged for splitting the digitised audio signal into at least two frequency bands and for performing level adjustment on each of the frequency bands. Such frequency band splitting can be combined with computing the filter settings (i.e. the filter coefficients) or with selecting a predesigned filter.

In yet another embodiment the programmable digital signal processing means further comprises means for delaying the digital audio signal in the main signal thread, so that a look-ahead delay is available in the second signal path, which allows for reducing artefacts that arise due to a too slowly reacting automatic gain control, such as insufficient protection from sudden loud sounds.

Preferably the programmable processing means is arranged for determining a digital gain factor that allows limiting the amount of signal clipping in the D/A module and limiting acoustic feedback from the acoustic transducer to the microphone.

The control logic is preferably arranged to permanently determine the parameter settings of the hearing loss compensation that are optimal for the individual amplification needs in the current listening situation. The control logic learns in which listening situations the hearing impaired has made changes to the parameter settings and the control logic is also aware of adaptations to parameter settings made in software by an expert or audiologist.

In one embodiment the control logic is arranged for updating the parameter settings on a change of the listening situation or on a change in the input to said control logic. Alternatively, the parameter settings may be updated by the control logic at a fixed rate, e.g. a number of times per second.

In another embodiment of the invention the situation analysis is based on acoustic scene analysis including but not limited to the application of statistical methods and machine learning techniques to characterize or classify the sound environment.

In yet another embodiment the signal analysis block is further arranged for also taking into account context-aware information, like for example time of the day, geographical location (at home, at work, commuting, elsewhere), gender and age of the user, calendar appointments of the user, etc. This information on the listening situation can be obtained via the sensing means.

In an important preferred embodiment of the invention the personal communication device is further arranged for establishing a connection, preferably a bidirectional connection, to a server external to the personal communication device. The connection is typically an Internet connection that allows the server to directly provide audiological information to the control logic in all communication devices connected to the server and to receive relevant information from all connected devices. In the opposite direction, data to monitor the user behaviour can be sent to the server.

In a preferred embodiment the control logic is arranged for interacting with a speech processor of a cochlear implant.

In one embodiment the personal communication device is arranged for generating a stimulation pattern for a cochlear implant. The stimulation pattern is subsequently sent to the cochlear implant.

In one embodiment the personal communication device is arranged for broadcasting and receiving streams of audio signals for use e.g. in a classroom situation, or in a theatre, museum or church.

In another aspect the invention relates to a method for providing a personal communication device with hearing support, whereby it is to be noted that the personal communication device is different from a conventional hearing aid. The personal communication device comprises an input for receiving an input audio signal, programmable processing means and an output for outputting said processed input audio signal. The method comprises the steps of adapting the programmable processing means for performing a filtering operation on a digitised version of the input audio signal whereby the filter coefficients are determined based on parameter settings and on said digitised version of the input audio signal, adapting the programmable processing means for providing control logic which determines the parameter settings based on user preferences, on audiological information and on information about the listening situation, in which the personal communication device is used, obtained via sound environment analysis of the received audio signal and/or via sensing means of the personal communication device, whereby the parameter settings are so determined that the programmable processing means operates as a hearing loss compensation module arranged for outputting a hearing loss compensated signal. This signal can be presented acoustically, it can be transformed by a cochlear implant into an excitation pattern or it can comprise the excitation pattern.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
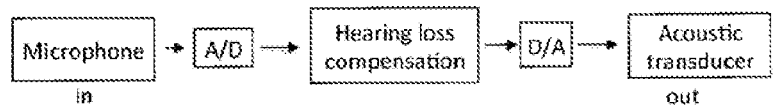
FIG. 1 illustrates a prior art digital hearing aid solution.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to a personal communication device with audio processing capabilities. In order to provide hearing loss compensation to hearing impaired people regardless of whether hearing professionals are available or not, the personal communication device of the present invention is enriched with a software implementation of the functionality of a hearing aid, cochlear implant, a bone anchored hearing aid, middle ear implants or tactile hearing aids. According to the invention the mass-produced consumer device is so transformed into a hearing support system. For example, the hearing loss compensation can happen in a smartphone and the smartphone with its microphone and internal speakers or its headphones or ear buds becomes a hearing aid. In the rest of this description the personal communication device is regularly referred to as a "phone", "mobile phone" or "smartphone". However, these are merely examples and the skilled person will appreciate the invention is not limited to current telephone technology: any evolution or variant thereof can also be considered as well as a completely different personal device that is capable of digital audio processing like a portable gaming console, music player, etc. Any consumer communication device can be utilized as long as it allows for audio input (via built-in microphone or a line-in connector for external microphones or other means of audio input), comprises a programmable central processing unit with access to the sound signal, and provides audio output (a speaker, a line-out connector to connect ear buds or head phones or other means of audio output). Further (rich) user interaction must be possible, e.g. via a touch screen. Internet connectivity is also preferably available.

Due to the application of consumer hardware, the device of the invention is distinct from a hearing aid, although it has some common properties. For example, the device can pick up the sound environment by means of a microphone, it processes the sound by executing a set of instructions in the processor means, which due to that set of instructions can be seen as a hearing loss compensation module. In this processor/hearing loss compensation module, the sound is modified in order to partly restore the hearing impairment. Finally, the device contains means to present the sound output to its user. This basic signal flow, which is common to the state-of-the art digital hearing aid and to this invention, is still as illustrated in FIG. 1.

Figure 2:
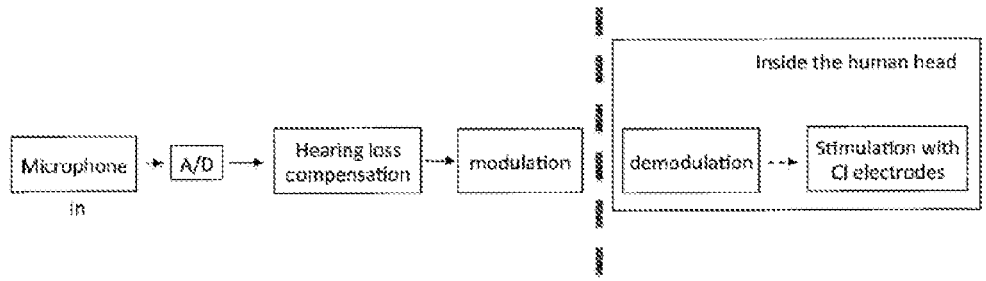
FIG. 2 illustrates a prior art cochlear implant.

The invention can be used to send the audio signal to different outputs. For example, the already mentioned FIG. 2 illustrates a state-of-the-art cochlear implant, which also has a hearing loss compensation module, but it differs in the modulation and demodulation stage being positioned outside and inside the head of its user. The invention can be used to execute the hearing loss compensation functionality of a cochlear implant in a personal communication device like for example a smartphone, which allows replacing the otherwise custom-programmed head-worn speech processor with a non-individual non-programmable unit, while the individual parameter setting and the processing of the audio signal is carried out in the personal communication device.

The invention can also interface with bone conductive implants, middle ear implants or a combination of any of the before mentioned devices. The invention can further be linked through an induction loop system ("telecoil") to low-cost hearing aids. In this case, the signal processing in the hearing loss compensation module (hence, the processing means) needs be aware of the signal changes in the receiving device, e.g., automatic gain control or frequency shaping. One possible implementation of a telecoil uplink to a linear hearing aid is to disable the signal processing in the analogue head worn hearing aid and to set it in a linear (transparent) mode without any frequency shaping. In this configuration, the low-cost hearing aid is useful to allow for low delay wireless uplink of the signal to the ear through the telecoil while at the same time yielding high output levels.

Figure 3:
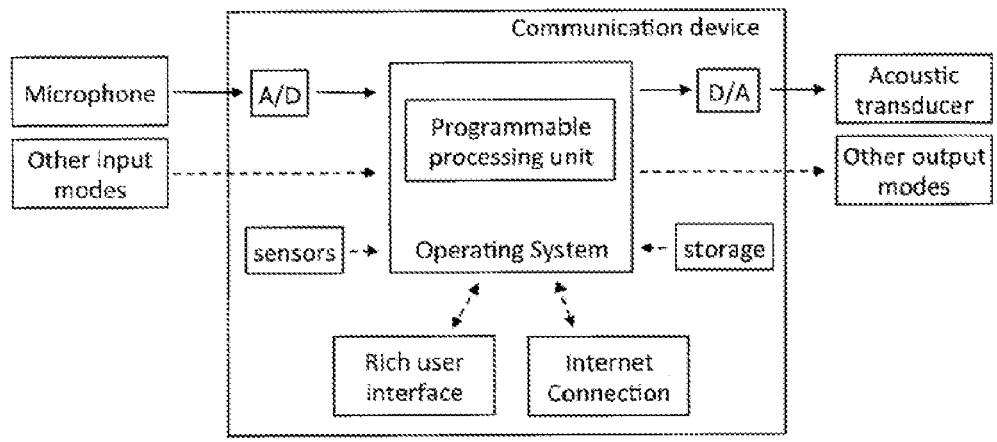
FIG. 3 represents a high level view on the basic hardware blocks of a communication device according to the invention.

The invention is based on a personal communication device with the following hardware components: an A/D converter, a general purpose programmable processing unit that operates on the digitized audio signal, means for sound output of the signal processed in the processing unit, and preferably Internet connectivity. A high-level scheme of an embodiment of a personal communication device according to the present invention is shown in FIG. 3. FIG. 3 also shows additional features of the personal communication device that may be employed in the invention. Alternative input modes can include a telephone call signal, a signal from Internet telephony, a signal received through device's Internet connection and/or a second microphone. On the output side, the acoustic transducer can be ear buds or headphones, but also the vibrator of a bone anchored hearing aid. Other output modes include a modulator for use in a cochlear implant (see FIG. 2) or output to Internet telephony software. Again, the flow of the audio signals is shown as solid arrows in FIG. 3. The invention capitalizes on this advanced hardware and adds advanced signal processing techniques to implement the hearing support functionality.

The hardware of the personal communication device also includes additional sensors such as a clock (providing the time, the day of the week, and the season of the year), an accelerometer or gyrometer for motion detection and classification (sitting, walking, etc.), and location sensors such as GPS, GSM cell tower based location or wireless base station based localization. Sensor data is accessed through system calls to the operating system of the phone. The hardware further includes a rich user interface, which can for example be a graphical touch screen display, which can be used both by the hearing impaired user and by the hearing professional to control and change various parameters. The flow of these control signals is indicated by the dashed arrows in FIG. 3.

The device advantageously also includes means for data storage. The storage can store instruction sets and parameters as well as multimedia content such as music and videos. The storage also allows the user to record and reproduce audio recordings. The storage also functions as a network connection cache. It can temporarily store data in the case of a temporarily dysfunctional Internet connection in order to be sent to the server when the Internet connection is re-established at a later point in time.

In a preferred embodiment the invention is implemented in the programmable processing unit in the form of instructions, written in high level programming languages such as for example C, C++ and Java, using a high-performance floating-point unit and access through the operating system to audio input and output, the sensors, the touch screen, the Internet connection and the data storage.

Figure 4:
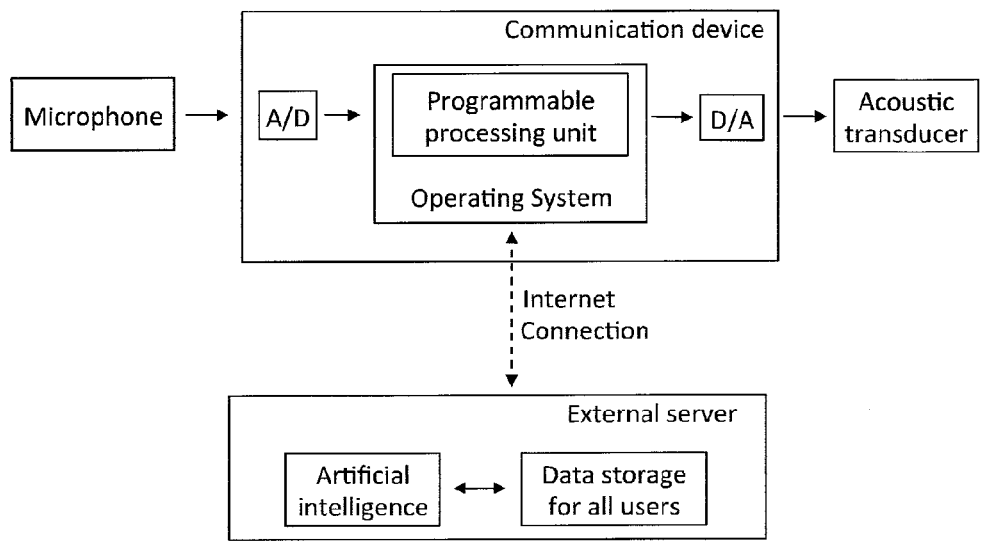
FIG. 4 represents an embodiment of the invention wherein the personal communication device is in connection with an external server.

In an advantageous embodiment the personal communication device is in connection with an external server via an Internet connection as illustrated in the vertical dashed arrow in FIG. 4. The Internet connection is especially helpful to hearing impaired users when no hearing professionals are available in their proximity, because the invention allows remote parameter adjustments (remote fitting), remote servicing and remote rehabilitation through the Internet connection.

Figure 5:
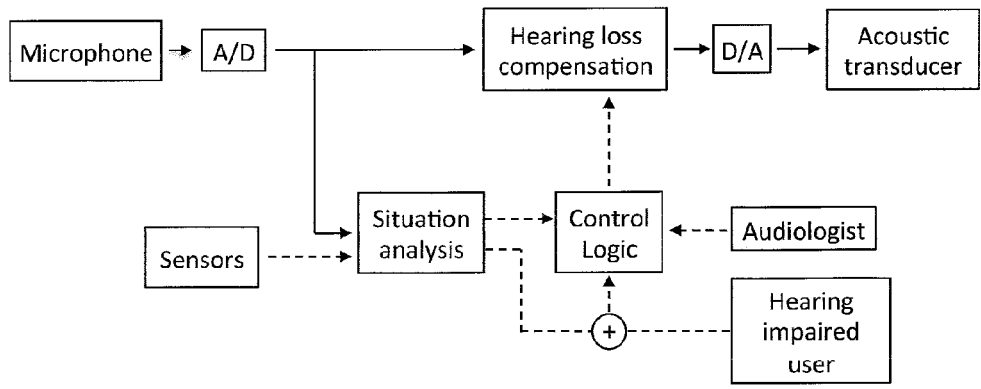
FIG. 5 illustrates a view on the flow of the signal (solid lines) and the control signal (dashed lines) in the solution of the invention.

FIG. 5 introduces the control logic module and its various inputs. A processing means duly programmed to act as a hearing loss compensation module receives the (A/D converted) audio signal from a microphone and delivers the amplified and optimized sound to the speaker, which can be an ear bud, a (Bluetooth) headset or any other kind of speaker. The hearing loss compensation has two inputs: the digitized audio signal and a set of parameters from the control logic. The programmable processing means is also adapted (meaning duly programmed) for providing control logic for determining the parameter settings. This parameter set controls details of the hearing loss compensation module. The output of the control logic module reflects details of the architecture of the hearing loss compensation module and its parameters. Some of these parameters is audiological information that is frequently used during the fitting process and well known by an audiologist, such as compression ratio, knee point, time constants used by the level detectors, gain specification in frequency bands, maximal output limitations, etc.

The control logic is one of the features that differentiates the invention from state-of-the-art hearing aids. In conventional technology, the parameters of the audio processing are mostly static: their values are typically left unchanged from what the hearing professional sets them during the fitting process. Only a small number of parameters such as the volume and the active listening program are dynamically adapted by the hearing impaired user. Newer concepts and products use algorithms that analyze the microphone signal to activate or deactivate features like directional microphones and noise reduction according to the listening situation, e.g., the directional microphone is activated when a voice signal in background noise is detected. However, these algorithms have a limited set of input signals and in the best case change a very small subset of parameters.

The transfer function calculation module is at the core of the signal processing. In the present invention, the control logic module provides the transfer function calculation module with a continuous stream of value updates that cover a wide variety of parameters of the transfer function calculation module, see FIG. 5. A continuous stream of value updates is to be construed as happening very frequently, e.g. several times per second or triggered by each change of the listening situation or by any change in the input to the control logic. This continuous update of the settings for the signal processing parameters differentiates the invention from state-of-the-art technology.

Figure 6:
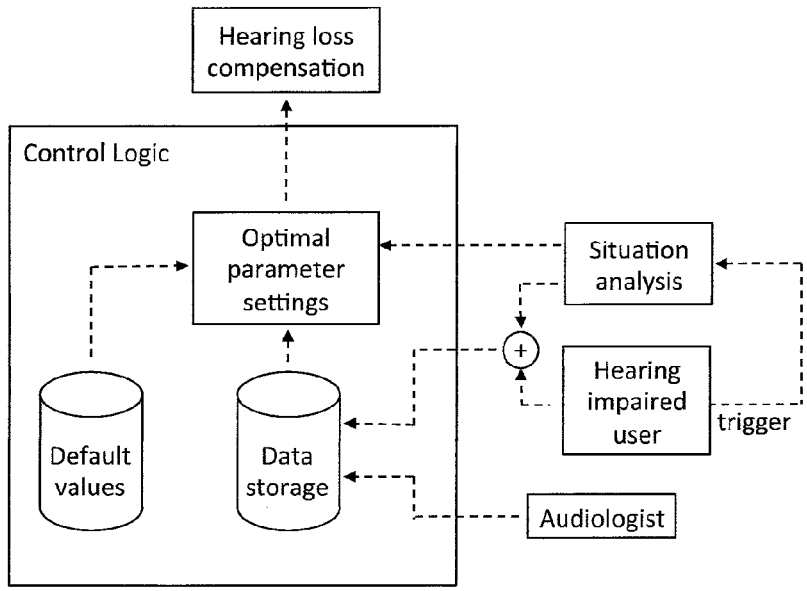
FIG. 6 illustrates the information used in the control logic: the input from the audiologist, the hearing impaired user and the situation analysis.

The continuous optimization of the parameter values is implemented in the control logic module, see FIG. 6. During the fitting process the audiologist provides a first input of the control logic. This fitting process can forego on the device itself or over the Internet using the network capabilities of the device of the invention. The audiologist modifies the values of audiological parameters including but not limited to the compression ratio, time constants of the automatic gain control, the gain settings in the equalizer bands. The settings of the audiologist are stored in the data storage module inside the control logic module. The second input to the control logic is any change that the hearing impaired user is applying by using the controls presented on the touch sensitive screen of the personal communication device. Again, these changes are stored in the data storage module.

Whenever the hearing impaired user changes the settings of a parameter, the situation analysis module is triggered to provide a characterization of the listening situation in which the hearing impaired user made the change. The situation analysis module has access to the sensors of the device. In addition, it performs an analysis of the microphone signal. The resulting characterization of the listening situation is a rich set of descriptors, which goes beyond a simple categorization of the listening situation or an index to an array of a predefined set of listening situations. The categorization of the listening situation together with the time stamp of the trigger is then stored with the new parameter values requested by the hearing impaired user in the data storage module of the control logic.

All changes to the settings of parameters done by the audiologist or by the hearing impaired user are stored in the data storage of the control logic. The optimal parameter settings module of the control logic has access to all of these data entries. In addition, the optimal parameter settings module has also access to a default value module, which stores a single value for each parameter, namely the default value.

In one embodiment of the optimal parameter settings module, the values of the parameters are determined using the following algorithm:

For each parameter:
1. Set the resulting value to the default value of the parameter
2. Overwrite the resulting value with the most recent values provided by the audiologist, if the audiologist has adjusted this parameter. The most recent values are determined using the time stamp that is recorded with each entry into the data storage module.
3. Overwrite the resulting value with the most recent values provided by the hearing impaired user, if the hearing impaired user has adjusted this parameter.

This algorithm responds directly to any value change of the hearing impaired user.

In a more advanced embodiment the algorithm looks at the differences between the current listening situation and previous listening situation in which the user has made adjustments. The distance between listening situations can be calculated as the Euclidian distance of a subset of descriptors of the situation. This subset of descriptors may consist of the geo-location of the situation, the shape of the frequency spectrum, the amount of modulation at relevant modulation frequencies, for example 4 Hz, 16 Hz and 64 Hz.

In one embodiment the algorithm triggers the situation analysis module to characterize the current listening situation and execute the following steps for each parameter:
1. Set the resulting value to the default value of the parameter
2. Overwrite the resulting value with the most recent values provided by the audiologist, if the audiologist has adjusted this parameter.
3. If the hearing impaired user has adjusted the parameter, calculate the distance between the characterization of the current listening situation and characterizations of listening situation in which the hearing impaired user has adjusted the parameter. If this distance between the two characterizations is below a threshold, apply the value of the parameter that has been changed at the corresponding instance.

This algorithm responds directly to any value change of the hearing impaired user, but the value of the parameter changes when the user is in a different listening situation. One example of this embodiment could for example learn the amplification needs of a user in his home and at work. The situation analysis could use the location capabilities of the device to locate the user in space and increase the robustness of the situation analysis by detecting typical audio patterns in the microphone signal. If the user shows a systematic behavior in one of these situations, the algorithms are able to learn and automatically reproduce these situation-dependent settings. If the user is at a new and unknown location, the algorithm can fall back to databases of the average noise level at this location, relying on noise maps.

In yet another embodiment, an additional set of parameter values is kept in the data storage module. The values of this set of parameters are initially set to the most recent values that the audiologist has chosen, or to a default value if the audiologist has not specified a new value for the parameter. Any time the hearing impaired user realizes a value change of a parameter, the additional set of values is altered to reflect the amplification need of the hearing impaired user. For example, changes in the global gain that the hearing impaired user can adjust with the help of a volume slider in the graphical user interface can result in a change of the compression ratio. For this change, characterization of the listening situation in which the hearing impaired user changed the value is critical. If the hearing impaired user for example systematically increases the sound volume of soft sounds only, the compression ratio of the automatic gain control would be increased as a result of this algorithm. If the hearing impaired user changes an equalizer value, the algorithm will gradually adapt its amplification to yield the requested amplification in the specific listening situation. The advantage of this embodiment is that similar listening situations result in similar parameter values. This allows to approximate the amplification need of the hearing impaired user even in listening situations that have not explicitly been adjusted by the hearing impaired user. In this embodiment, the output of the control logic is the additional set of values of all parameters. This algorithm does not respond directly to the value change of the hearing impaired user. Instead, it gradually approaches a setting that corresponds to the amplification need of the hearing impaired user.

Although the control logic can react quickly to changes in the sound input, its purpose is not to provide protection against sudden loud sounds. This protection is part of the automatic gain control in the hearing loss compensation module.

The control logic can execute additional algorithms that run in parallel to the already mentioned algorithms. One example of such a parallel algorithm may for example use the categorization of the listening situation that contains predominantly speech (e.g., by certain spectral components and by the property of the signal modulation). The result of these additional algorithms could be used to manipulate the output of the control logic in the presence of a voice signal, for example to give more amplification, to use longer time constants or to activate a directional microphone. In sound environments that do not contain speech, the gain could be reduced (either wide band or specifically at the frequencies that contain most noise energy). Own voice detection can be used to alter the signal processing parameters to make the own voice more pleasant. This can also be useful to reduce other sounds that are produced inside the head (such as chewing, coughing). Similarly, a doorbell can be recognized and trigger an alarm, or the sound of approaching cars could be amplified for safety reasons.

The control logic is providing a permanent output stream with ever-changing parameter sets that vary from one listening situation to another. The control logic optimizes in each situation the set of parameters for the hearing loss compensation module that will yield the best results for the hearing impaired user. Based on these parameters, the hearing loss compensation module is enabled to produce the output audio signal, which is optimized for the given situation (sound environment, location, time) and the amplification need of the individual user.

Figure 7:
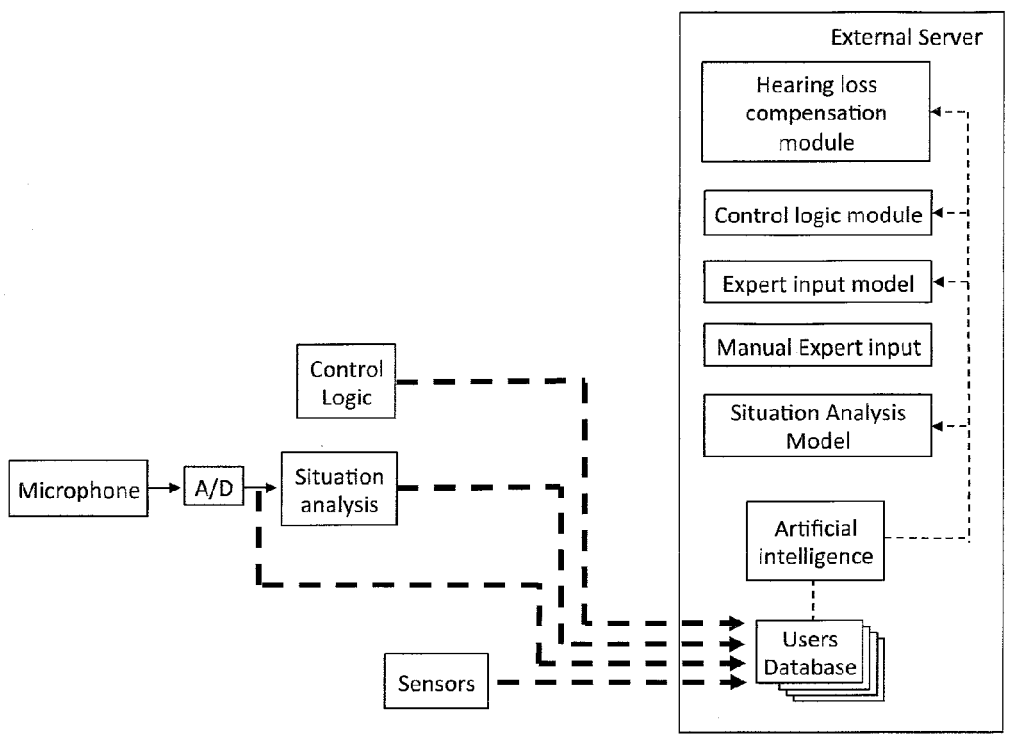
FIG. 7 illustrates the external server being provided with an update of changes in the devices: user changes, their context, sensor data as well as the resulting decision of the control logic.
Figure 8:
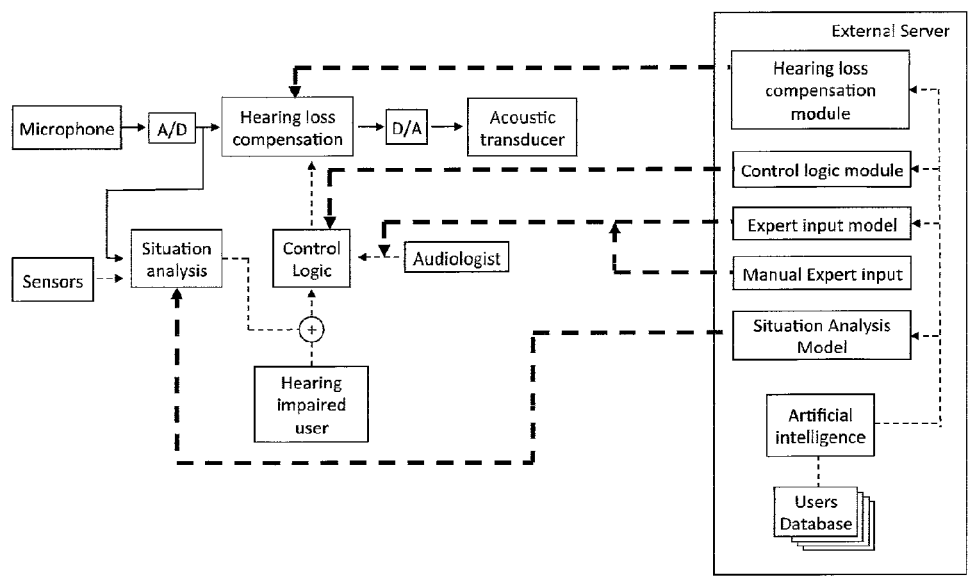
FIG. 8 illustrates the external server providing a manual and an automatic input to the control logic module and updating the implementation of the situation analysis block and the control logic module.

The communication between the server and the personal communication device is illustrated in more detail in FIG. 7 and FIG. 8. The server is updated about the inputs and outputs of the control logic for a specific user and adds this information to its database. In this database, information is gathered from all devices that are connected to the server.

FIG. 7 illustrates how the Internet connectivity allows the personal communication device to provide the server with a steady stream of information about the listening situations and any user adjustments on the device. Furthermore, the control logic module provides the external server with information of its inputs and output. The sensors of the phone provide input to the server only on request by the server or when triggered by events such as user adjustments. The database in the server will also tap into other Internet based data sources, such as noise landscapes that can inform the server about the average noise level at a given location. These noise landscapes can be based on own observations, utilizing the location functionality in the devices, or on external sources.

The external server can provide two types of inputs to the device (see FIG. 8). First, the manual expert input module and the expert input model can both recommend a set of parameters to the control logic in any of the connected devices (see the bold dotted line going to the control logic in FIG. 8). This functionality mirrors the input from the audiologist and is important in two scenarios: if the distance between the hearing impaired user of the device and the hearing professional is too large, the hearing professional can use a computer to set the parameter input to the control logic of the device of the hearing impaired user (manual expert input). This scenario is typically referred to as "remote fitting". In addition, the server can recommend parameter settings without any human intervention. This is a fall-back solution if no hearing professional is available, for example because the number of trained hearing professionals is too low to serve the hearing impaired population in developing countries. The automatic recommendation is based on an artificial intelligence or machine learning algorithm that observes which kind of recommendations hearing professionals give for other hearing impaired with a similar diagnosis and similar complaints. The intelligence of this automatic recommendation is trained with observations that are automatically gathered from a large number of hearing impaired users connected to the server. Based on these observations, the expert input model is created in the server.

Figure 10:
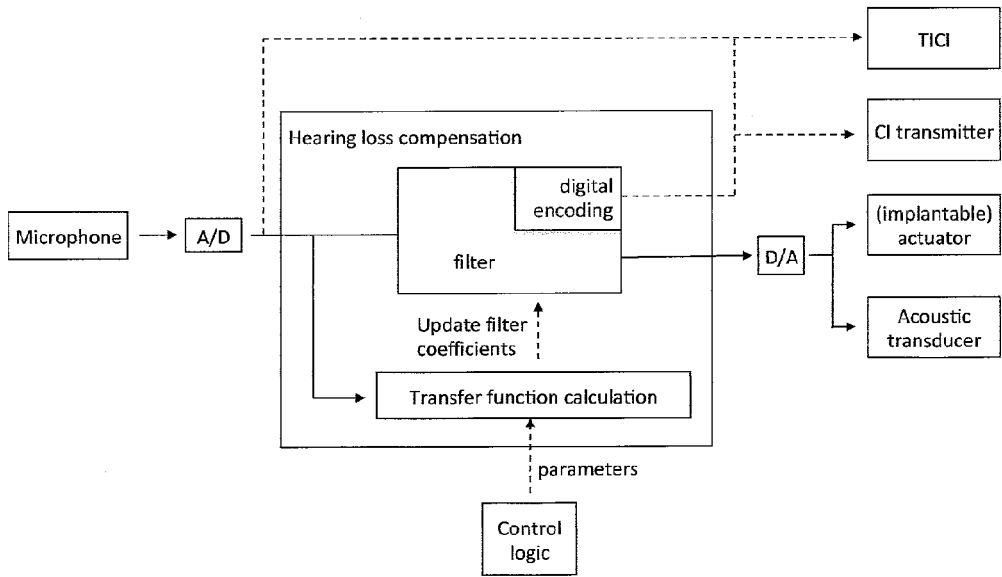
FIG. 10 represents an embodiment of the invention, where in the hearing loss compensation module a single filter is provided in the signal path. Four different inputs are shown.
Figure 11:
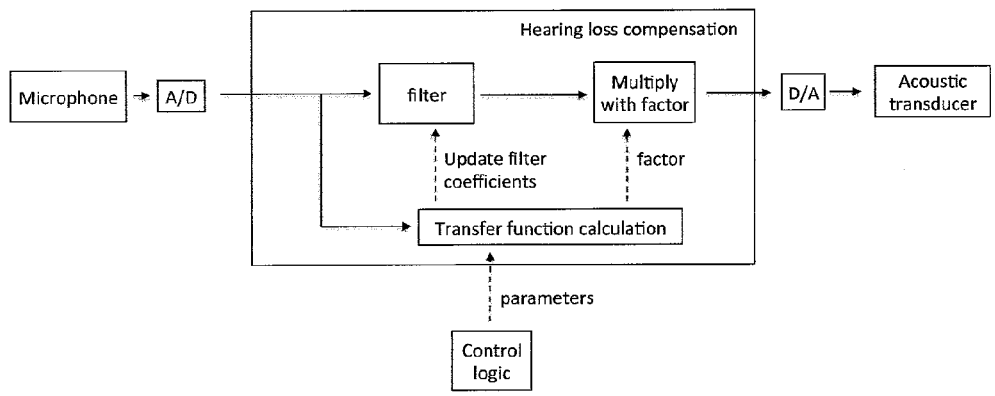
FIG. 11 shows an alternative embodiment wherein the signal path contains a filter and a multiplication unit.

When the knowledge in the scientific community is updated, the artificial intelligence that builds models for the hearing loss compensation with a signal processing different to the ones shown in FIGS. 10 and 11, the control logic, the expert input and the situation analysis can be modified to reflect this new knowledge. A simple example is the already mentioned adaptation of a fitting rule. Another example can be new methods for the situation analysis.

The artificial intelligence on the server is also used to improve the situation analysis module in order to better characterize situations that are relevant to most users. In general, the strength of the server is that it can rely on data gathered across users to improve the inner workings of the personal communication device of individual users.

In comparison to conventional hearing technology, new scientific knowledge can be fed at a much higher pace into the device to improve the hearing loss compensation.

As described above, the control logic can learn to automatically and adequately react to a change in the listening situation. If the user repeatedly reduces the amplification in a situation, the algorithm in the control logic will learn this behavioural pattern and start to automatically reduce the amplification in this situation. However, the server can also observe and learn from these behavioural patterns. If many users with a similar hearing loss desire less amplification in a specific situation, this knowledge can be added to the rule set of the control logic in order to add a bias towards less amplification in the corresponding situation. This type of automatic amplification adjustments is especially useful in the case of infants, senile or mentally challenged hearing aid users that are limited in their ability to give direct feedback to the parameter settings.

Figure 9:
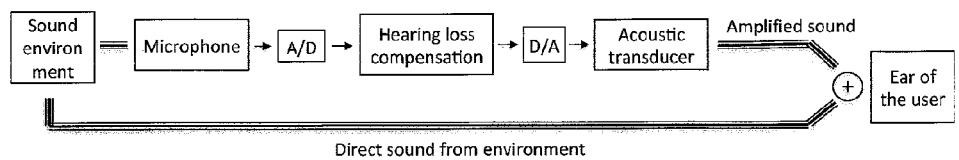
FIG. 9 illustrates the importance of maintaining a small delay in the hearing loss compensation module when a non-amplified, direct sound is perceived simultaneously with the amplified sound.

FIG. 9 represents the two sound signals reaching the ear of the user: the non-amplified, direct sound is perceived simultaneously with the amplified sound. When these two signals are audible at the same time and the delay of the amplified sound is too large, undesirable side effects can occur. Therefore, it is required to keep the delay in the hearing loss compensation module small. As mentioned for example in the paper "Tolerable Hearing Aid Delays: I. Estimation of Limits imposed by the Auditory path Alone using Simulated Hearing Losses" (M. Stone et al., Ear & Hearing, June 1999, Vol. 20, issue 3, p. 182), the time delay between bone-conducted sound and aid-conducted sound experienced by people wearing hearing aids is rated as disturbing for values exceeding 20 milliseconds. This clearly illustrates the importance of keeping the delay (latency) introduced by the digital signal processing as low as possible.

Hence, one of the most important technical aspects in the embodiments of the invention is to keep the latency introduced by the hearing loss compensation module at a minimum. While conventional hearing aids aim at audio latencies below 10 to 15 milliseconds, the operating system of consumer devices (e.g., smartphone operating systems such as iOS, Android, BlackBerry OS or webOS) add an additional delay to the signal chain at the moment when an instruction is executed to the operating system to fetch one or more audio samples from the sound input signal or to output one or more processed audio samples. The latency of a conventional hearing aid is the sum of the hardware latency (the latency of the anti-aliasing filter used to restrict the signal bandwidth to satisfy the sampling theorem, the latency of the A/D and D/A conversion) plus the latency introduced by the signal processing. Similarly, the latency of the device according to the invention is the observed total latency between the sound signal picked up by the microphone and the sound output. This total latency stems from the sum of several components: the latency of the anti-aliasing filter, the A/D converter, the buffering in the audio hardware driver for sound input, the buffering in operating system modules for sound input, the latency of the hearing aid signal processing, the buffering in higher operating system modules for sound output, the buffering in the audio hardware driver for sound output and the latency of the D/A converter. Additional latency can occur if the (mobile) phone based hearing aid sends the sound to the ears wirelessly. The delay of some of these components cannot be altered without the collaboration of the manufacturer of the communication device or the manufacturer of its operating system. Therefore, the communication device according to the present invention aims at a minimal delay in the main signal path in the processor in order to minimize the total system delay.

In contrast, the sound processing or wireless transmission of the sound sources in U.S. Pat. No. 6,944,474 and U.S. Pat. No. 7,529,545 is allowed to be considerably larger without audible artefacts for the user. This is because in these prior art solutions the environmental sound is not amplified in the device. Consequently, the problem of sound summation as illustrated in FIG. 9 does not occur.

The hearing loss compensation module can have many possible embodiments, see FIG. 10 and FIG. 11. In order to achieve a low signal processing delay necessary for an implementation in a personal communication device, a low latency hearing loss compensation module comprises two signal paths. The first signal path is provided with filtering means for filtering a digital audio signal input to generate a sound signal suitable to improve the sound quality and speech intelligibility for the hearing impaired user. The second signal path works in parallel to the first signal path. The second signal path is receiving the input signal from the microphone and analyses the sound level in one or more frequency bands. The configuration of the second signal path is determined by the output of the control logic. The second signal path contains a module for transfer function calculation which calculates the filter coefficients of the filter used in the first signal path.

Figure 13:
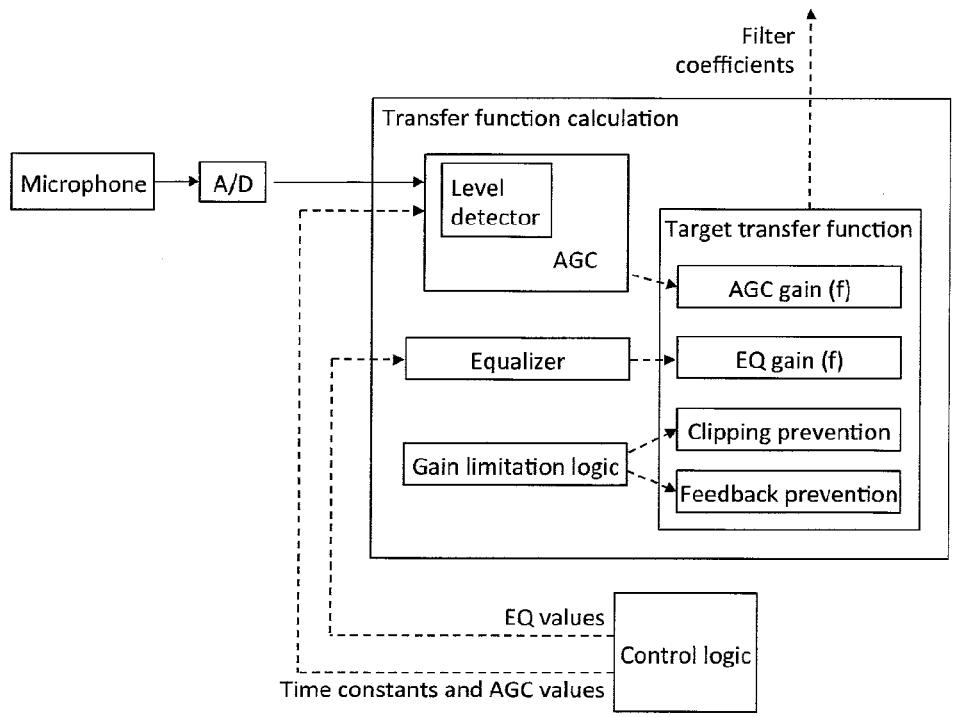
FIG. 13 illustrates a possible implementation of the transfer function calculation module.

FIG. 10 represents one advantageous implementation to achieve low latency signal processing. In a first signal path a digital filter is applied to the signal. In a second parallel signal path the same signal is input to a transfer function calculation module, which is illustrated in FIG. 13. The coefficients of the filter in the upper signal path need to be updated on a regular basis, e.g. each millisecond. The transfer function calculation module in the second signal path receives two inputs: the audio signal and a parameter set from the control logic. In the transfer function calculation module the filter coefficients are calculated to yield a digital filter that has the property of providing the desired gain at each frequency.

The update of the filter coefficients happens continuously in order to react to changes in the input signal. The filter alters the audio signal and sends the filtered signal to the D/A converter. In case of a Cochlear Implant (CI) the filtered signal is not sent to the D/A converter, but instead it is digitally encoded to be transmitted to the cochlear implant. A Totally Implantable Cochlear Implant (TICI) would normally operate completely independent of the device shown in FIG. 10. However, if the microphone in the TICI stops working, the signal can be taken after the A/D converter and forwarded to the TICI. Alternatively, the signal processing of the TICI can be replaced by signal processing in the device. In this case, the digitally encoded signal is transmitted to the TICI.

The advantage of signal processing with two signal paths lies in that it can easily be optimized for a low signal delay. An even lower signal delay is achieved by the choice of a Finite Impulse Response (FIR) filter with only few coefficients or by the use of an Infinite Impulse Response (IIR) filter.

In an implementation based on IIR filters, carefully designed minimum phase filters are to be employed. One example of minimum phase IIR filters are Linkwitz-Riley filters. They reduce signal smearing and minimize the overall group delay of the filter. Minimum phase filters achieve this by concentrating the most of the energy at the start of the impulse response. However, the described signal processing architecture can also be based on FIR filters.

In one implementation, the IIR filter comprises of two stages. Stage 1 compensates the hearing loss at a typical sound input level (e.g., 70 dB SPL) according to the gain prescribed by the fitting rule. The filter coefficients of stage 1 are updated each time the desired constant transfer function is changed, for example by a change of equalizer settings or by a change of the parameters that describe the hearing loss. The filter in stage 1 does not depend on the input signal. The stage 1 filter needs to be able to yield a shape of the resulting transfer function that has sufficient degrees of freedom to implement settings in the equalizer in which neighbouring bands have very different gains. Stage 2 is a cascade of dynamic shelving filters that filters the output of stage 1 and provides an input signal dependent change of the transfer function. Since the input signal is changing, the coefficients of the IIR filter need to be updated. The advantage of the described separation of the filter into two stages is that only the filter coefficients of the filters in stage 2 need to be recalculated when an input signal characteristic changes. This considerably reduces the computational load on the processing unit.

The degrees of freedom required in the filters of stage 2 might be considerably lower. In the state-of-the-art implementation of a multi-channel automatic gain control with more than 10 channels, these channels do not operate independently. Instead, neighbouring channels are linked to each other to avoid audible artefacts. In the invention the required dynamic frequency shaping is achieved with a small number of easy-to-design shelving filters while providing a good frequency resolution of the transfer functions in the filters of stage 1.

In summary, the digital signal processing means shown in FIG. 10 has a first signal path provided with filtering means for filtering a digital audio signal input to the digital signal processing means and a second signal path in parallel with the first signal path. The second signal path comprises a transfer function calculation block arranged for receiving the digital audio signal and the parameter settings as determined in the control logic module and is further arranged for calculating the transfer function settings of the filtering means based on the provided parameter set. Any lag of signal analysis that occurs in the second signal path does not increase the delay of the audio signal in the first signal path.

The calculation of the filter transfer function in FIG. 10 requires several instructions and can cause a lag in the ability of the personal communication device to react quickly enough to sudden changes in the input signal. The signal processing architecture shown in FIG. 11 is advantageous to the architecture in FIG. 10 because the multiplier unit can be used to yield a transfer function that has the same shape across frequencies, but at a different level. This allows the transfer function calculation module to react quickly to sudden changes in the level of the input signal without redesigning the digital filters.

In an alternative embodiment of FIG. 10 and FIG. 11, the filter coefficients are not continuously calculated in a filter design algorithm. Instead, a sufficiently large set of filter coefficients has been pre-calculated and stored on the device. The transfer function calculation module determines the desired transfer function and then picks the coefficients that best match the current need. The signal processing architecture shown in FIG. 10 is advantageous for this embodiment because the multiplier unit can be used to yield a transfer function that has the same shape across frequencies, but at a different level. This reduces the number of sets of filter coefficients that need to be pre-calculated. In this embodiment, the personal communication device advantageously comprises storage means for storing the set of predesigned filters.

In another embodiment the digital signal processing takes care to avoid audible artefacts when switching between two filters after a new filter had been designed or picked. Audible artefacts at the moment of the filter switch can be reduced by increasing the frequency of these switches, by an interpolation of the filter coefficients, by initializing the filter state of the new filter, by interpolation of the filtered signal or by a combination of these techniques.

The embodiments shown in FIG. 10 and FIG. 11 allow the implementation of a multi-channel automatic gain control (AGC). A multichannel AGC can be achieved by a single filter, because this filter can dynamically satisfy many possible needed frequency shapes. Of course, the transfer function calculation module has to utilize multiple level detectors that work in different frequency regions.

Figure 12:
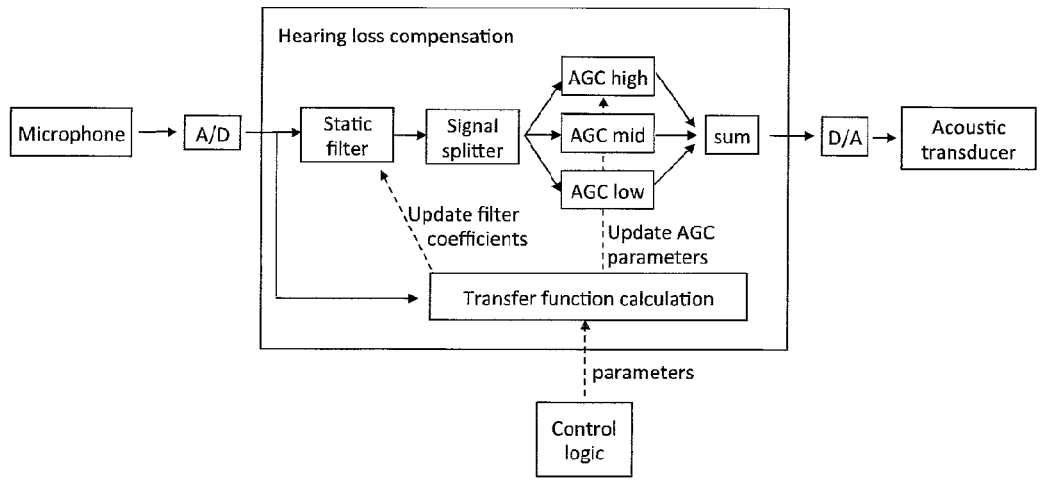
FIG. 12 illustrates an implementation of the hearing loss compensation module in which the automatic gain control is applied at the output of the filtering, resulting in a larger delay.

In contrast, other signal processing architectures such as the architecture shown in FIG. 12 contain a cascade of a filter and a subsequent automatic gain control unit. This configuration has a considerably larger signal delay, because the delay in the filter and the delay in the subsequent automatic gain control unit are additive.

Another functionality of the hearing loss compensation module is a single-microphone noise reduction. This noise reduction may be activated or deactivated by the control logic according to criteria such as the presence of speech in background noise.

Yet another functionality of the hearing loss compensation module is feedback reduction. In the simplest case, the dominant frequency region of a disturbing noise signal is detected and this frequency region receives less amplification. If the noise spectrally overlaps with a speech signal, more advanced noise reduction algorithms have to be applied. In a more advanced embodiment, the audio signal is modified by an adaptive filter to reduce feedback.

The operating system of the phone allows direct access to the user's video and music library. According to the invention these songs or the soundtrack of the video are accessed and reproduced to the hearing impaired user after having been processed to compensate for the hearing loss. Songs or soundtracks recorded in stereo are processed in two independent channels. The invention can further provide an automatic mix of the input modality between the microphone signal and the music stream. When the microphone picks up special signals such as a door bell or an approaching ambulance car these signals are mixed/added to the music signal while the music level is reduced. The detection of these special signals is handled in the situation analysis module.

The requirements for the signal processing of stored content are relaxed in comparison to the requirements for the processing of microphone signals: since the microphone signal is not amplified, acoustic feedback between the sound output and the microphone cannot occur. Also, larger signal delays go unnoticed by the user because of the absence of the direct, unamplified signal. The system architecture of the device according to the invention, which is optimized for low-latency audio processing, does not however harm the signal processing in this situation.

During the reproduction of music, the device of the invention uses metadata about the song and the genre of the music to change the signal processing settings recommended for this type of music. Examples of these settings include, but are not limited to giving more bass boost when listening to electronic music, and additionally reducing dynamic range for classical music.

The invention allows the user to prioritize either sound quality or battery life. This decision is made by the user in the graphical user interface, using the touch screen. A prioritization for battery life reduces the sample rate of the audio processing and the number of coefficients in the filters to place less load on the CPU.

The transfer function calculation module resides inside the hearing loss compensation module in the second signal path and provides the first signal path with the filter coefficients so that a correct situation-dependent gain is given at each frequency. FIG. 13 illustrates one embodiment of the transfer function calculation module that produces said output. One input to the transfer function calculation module is the audio signal. The audio signal level is detected by means of a level detector. This level detector operates on the audio signal and produces an estimate of the sound level. Alternatively the incoming signal could be split into two or more frequency regions and in each frequency region, one level detector would produce an estimate of the signal energy in this frequency region. Each level detector has one or more time constants that define its ability to quickly react to sudden changes in the input signals while maintaining a good sound quality by not changing the detected sound level too nervously. The values of the time constants are provided by the control logic. The level detector output is used as current input level in the AGC module in order to determine a gain that is needed to yield the desired output sound level.

The parameters of the AGC are provided by the control logic. These parameters can include but are not limited to compression ratio, knee points, signal expansion to reduce microphone noise in quiet situations, and threshold parameters to limit the output sound level in order to protect the user from very loud sounds. Within the control logic, a fitting rule is used to convert the hearing loss/audiogram of the hearing impaired user into equalizer values. These values are added to equalizer settings that can stem from various other sources, such as a bass-treble control used by the hearing impaired in the rich user interface to optimize the sound quality in a given situation, a graphical equalizer used by the hearing professional to fine-tune the amplification to the individual amplification need, and equalizer settings to calibrate and compensate for the frequency dependent characteristics of electroacoustic transducers (microphones, speakers, etc.). The control logic sums all these different equalizer values into a single equalizer, which is then given to the transfer function calculation module as input.

Within the control logic, a non-linear fitting rule can use the audiogram to specify the gain as function of the input level of the sound signal.

The gain limitation logic within the transfer function calculation module prevents signal clipping and feedback by determining maximal gain thresholds for each frequency. The target transfer function sums the gain calculations from the AGC, the fitting rule and the equalizer, and makes sure that these gains are below the gain limitation thresholds. Then, the transfer function calculation module designs the digital filter and sends the filter coefficients to the filter.

In the device of the invention the gain is the sum of the digital gain in the hearing loss compensation module and the gain of the analogue amplifier providing the signal to the acoustic transducer. The digital gain is applied to the digital signal, before the D/A conversion creates an analogue signal. This digital gain determines how close the values of the digital signal are to the maximal value of 1.0 in the case of floating-point numbers or 32768 in the case of 16 bit integers. In contrast, the analogue gain is applied to the signal after D/A conversion. This analogue gain is typically provided by the volume control of the (mobile) phone.

The gain perceived by users is the sum of the analogue and digital gain. In theory, either of the two can be adjusted by the user, but there are two reasons to preferably only reduce the analogue gain and keep the digital gain always maximal: (1) Quantization noise occurs when the signal is represented by small numbers, since the precision of the signal representation as integer numbers is worse for small signal amplitudes. The higher the digital gain the less quantization noise is added to the signal. (2) A low analogue gain results in less analogue amplification noise than a high analogue gain. For these two reasons, the digital gain is preferably maximized whenever a parameter attribute is changed. The only gain that can be adjusted during use then is the analogue gain. This gain is adjusted by the hearing impaired user using the controls that are provided by the mobile phone hardware or by the operating system.

The maximal value of the digital gain is limited by (a) audible signal clipping artefacts that create distortion and reduce sound quality and (b) audible feedback. Feedback occurs when sound leaks out at the speaker and is perceived at the microphone, creating an endless loop. Feedback depends on the transfer function of the hearing aid signal processing, the transfer function of the microphone, the transfer function of the speakers, the type of headphones or ear buds in use, the fit of these on or in the ears and other physical conditions like wearing a hat or holding a hand close to the ears. The risk of the complete system to create feedback can be estimated in a simple measurement: for each audiogram frequency, the digital gain is increased until feedback occurs. This measurement results in the frequency dependent maximal gain $G_{feedback}(f)$. In order to determine if the signal is clipped, a probe sound signal is used as input to the system and it is observed how many samples of the resulting output signals exceed the maximal value of 1.0 f. Since a few audio samples that exceed the maximal value may not result in an audible signal quality reduction, a certain percentage $p_{clip}$ of audio samples of the processed probe signal can be allowed to clip. After sorting all output signal amplitudes, it is easy to determine the gain value $G_{clipping}$ that results in exactly $p_{clip}$ clipped audio samples. The final digital gain is $G_{clipping}$, unless if the sum of the gain from the hearing aid signal processing at any frequency f plus $G_{clipping}$ exceeds $G_{feedback}(f)$. In this case, $G_{clipping}$ needs to be reduced accordingly.

In yet another embodiment the digital signal processing means further comprises means for delaying the digital audio signal in the main signal thread, so that a look-ahead delay is available in the signal analysis thread. The architecture of the transfer function calculation (FIG. 12) and the system architecture from FIG. 7 can be extended by means of this look-ahead delay to realize an overshoot prevention mechanism. Overshoot is a well-studied phenomenon that results from too slow a reaction of the automatic gain control to sudden signal changes. A small look-ahead delay can be introduced in the digital signal processor to allow the level detector to look into the "future of the signal" in order to allow the overall system to better respond to sudden level changes. This look ahead level detector of course adds to the overall latency of the signal path, since the preview of the "future of the signal" can only be achieved by delaying the main signal path. In the case of amplifying multimedia content, this look-ahead delay can be much larger, because larger delays go unnoticed in these situations.

Concerning the level detector the following is to be noted. In a preferred embodiment of the invention a weighted level detector is applied that is composed of two simple level detectors, namely a level detector $L_{fast}$ with a fast time constant and a level detector $L_{slow}$ with a slow time constant. The unit of these level detectors is the sound pressure level in dB SPL. The weighted level detector can then be calculated as the weighted sum between the fast and the slow level detector:

$$L_{weighted} = wL_{fast} + (1-w)L_{slow} \text{ with } 0 \leq w \leq 1$$

The weighting factor w is determined in a three-step procedure:

1. Each time a value for $L_{weighted}$ is requested, the difference between the two level detectors is calculated: $\Delta = L_{fast} - L_{slow}$.

2. The current value of w is compared to a value that is derived by the function weight($\Delta$) and w is set to max (w,weight($\Delta$)). The function weight($\Delta$) is for example given by: weight($\Delta$)=abs(0.06*$\Delta$) with a subsequent limitation of weight($\Delta$) in the value range of [0,1]. Other, non-linear weighting functions can also be used.

3. When $L_{slow}$ and $L_{fast}$ cross each other (in other words, $\Delta$ changes its sign), w is reset to zero. The abrupt change of w in step 3 does not result in an abrupt change of the value of $L_{weighted}$, because the values of $L_{fast}$ and $L_{slow}$ are similar when $\Delta$ changes its sign.

Figure 14:
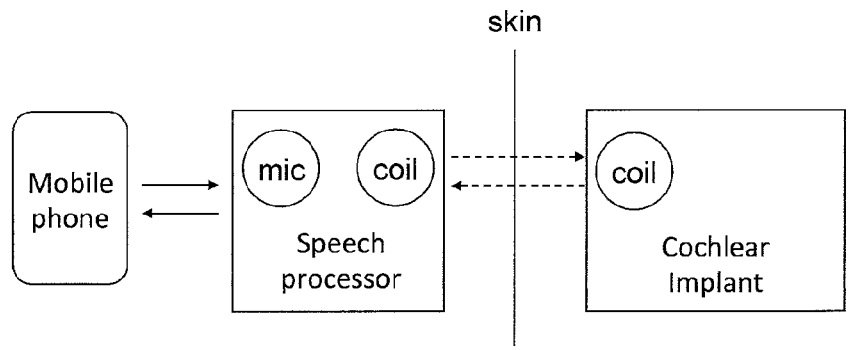
FIG. 14 illustrates a wired connection between the personal communication device and the cochlear implant. The personal communication device is informed about all parameters of the cochlear implant and changes these parameters to improve the fitting. The personal communication device can also substitute the speech processor.
Figure 15:
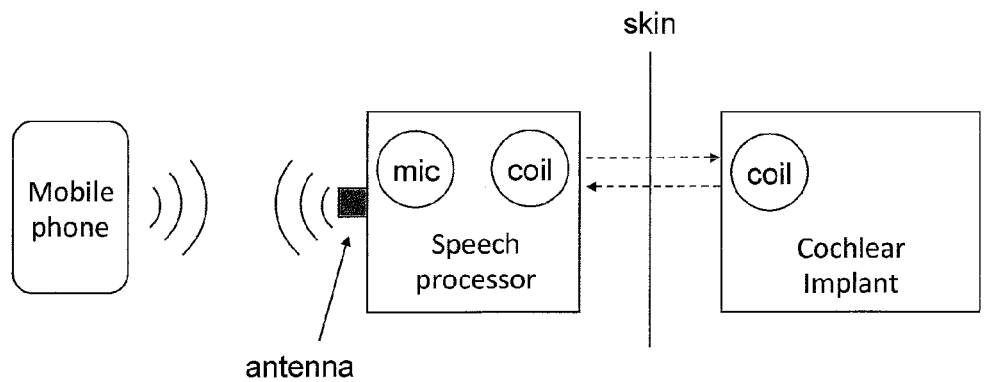
FIG. 15 illustrates a bidirectional wireless link between a personal communication device and a cochlear implant.
Figure 16:
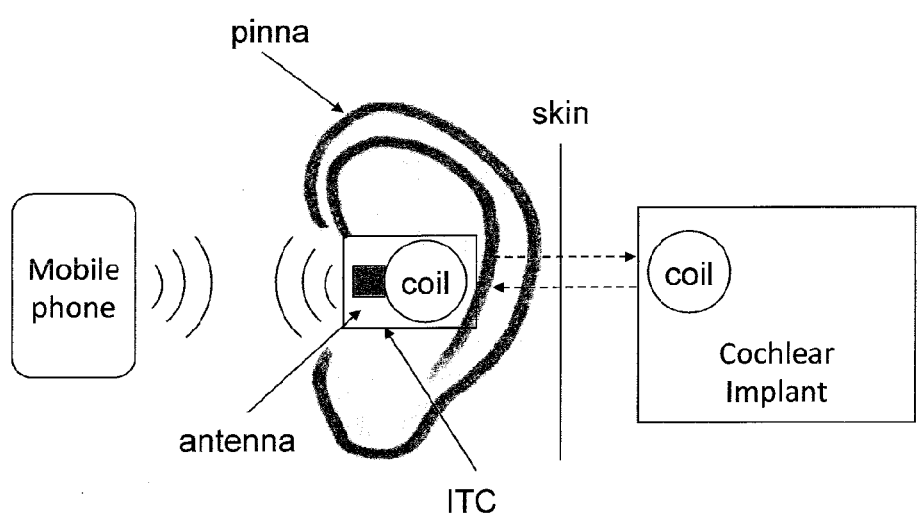
FIG. 16 illustrates a bidirectional wireless link between a personal communication device and a cochlear implant where the antenna and the external coil are situated in the ear canal.

According to the invention the phone can interact with a cochlear implant in three operation modes. In all three operation modes, the connection between the phone and the speech processor can be a hard wired electrical connection as depicted in FIG. 14. In this case, the energy needed in the implant can stem from the phone. Alternatively, all three operation modes can use a wireless connection between the phone and the implant as depicted in FIGS. 15 and 16. In this case, the parts that are externally worn at the head need to include an energy source to receive the wireless signal and to transfer energy to the implant.

In a first operation mode, the phone receives information about the parameter settings of the speech processor. During operation, the speech processor picks up the audio signal from its internal microphone, processes this signal to generate the stimulation pattern. After applying a modulation, the signal is sent to the cochlear implant using the external and the internal coil. This transcutaneous signal transmission is state-of-the-art in partially implantable hearing implants. If the implantable portion of hearing implant does not comprise its own battery also the energy must be transferred via RF coil, which is also state-of-the-art in partially implantable hearing implants. In this operation mode, the phone can alter parameter settings of the speech processor or of the cochlear implant. A signal protocol is used to inform the cochlear implant about the change of the value of the parameter. These changes can origin from the user (self-fitting), from the audiologist (fitting) or from the audiologist over the Internet (remote fitting). For any of these tasks in the first operation mode, the phone does not need to process any audio signal. Instead, its touch screen and Internet connection are used to provide rich remote control functionality.

In a second operation mode, illustrated in FIG. 15, the speech processor still uses its own microphone to pick up the audio signal that is used to generate the stimulation pattern. Simultaneously, the phone picks up the same listening situation with its own microphone and the audio signal obtained from the microphone (of the phone) is also processed in the phone as described above. The output of the control logic is then fed to the speech processor to provide the functionality of an automatic remote control in which the parameters of the implant are adapted according to the characteristics of the listening situation. This is different from the first operation mode because in the first operating mode, the phone helps fitting the implant to the needs of the hearing impaired user. In an alternative embodiment of the second operation mode, the microphone signal, which is picked up in the speech processor, is fed into the phone and used instead of the internal microphone or in addition to the internal microphone of the phone.

In a third operation mode (see FIG. 16), the speech processor is deactivated and the phone not only processes the audio signal, but also generates the stimulation pattern. The functionality of the head worn part is to receive the stimulation pattern, apply the modulation and transfer the signal to the implant. In an alternative embodiment, the modulation is also realized in the phone. In this case, the RF coil is the only external portion of the hearing implant attached to the skin of the user.

The advantage of the three operation modes lies in that it enables self-fitting, a richer platform for fitting, remote fitting, an automatic remote control, automatic warnings about hardware defects (partial failure due to broken wires, etc.). In all three operation modes the connection between the phone and the speech processor can be a hard wired electrical connection. In this case the energy needed in the implant can stem from the phone.

Figure 17:
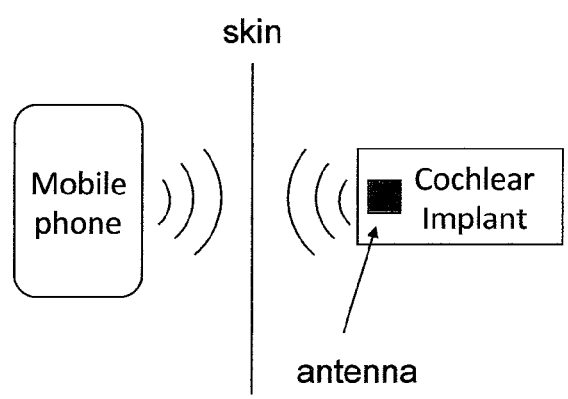
FIG. 17 illustrates a bidirectional wireless link between a personal communication device and a totally implantable cochlear implant where the antenna is implanted too.

If the implant has its own rechargeable battery, an alternative embodiment is possible in which the head worn parts receive sufficient energy from the implant to receive the wireless signal from the phone. In yet another embodiment, the implant has its own rechargeable battery and a transceiver to exchange audio signal and data with the phone (see FIG. 17). In this case, no external component will be necessary for the bidirectional link to the mobile phone.

In an alternative configuration of all three operation modes, the external coil is preferably located in the outer ear canal (or in pinna) as described in application US2011/130622. The coil plus antenna may be realized as an almost invisible in-the-canal (ITC) device. If the implantable portion contains no battery, the ITC device must contain a battery preferable located at a well accessible place. The signal and energy transfer would be implemented e.g. as described in US2011/130622. If the implantable portion comprises its own battery, the external portion either just needs a fairly small battery for providing energy to the components of the ITC device or energy for antenna may be provided by the implanted battery via transcutaneous energy transfer from inside the body to the outside. The implantable portion may also be a totally implantable cochlear implant.

During the self-fitting process, the hearing impaired user can use the touch screen interface of the phone to directly change values of some of the signal processing parameters while listening to the effect of this parameter change. However, this direct interaction of the hearing impaired user with parameters has disadvantages: the number of parameters is very large, most parameters are of a rather technical nature and their effect on the sound processing is not easy to understand for a non-expert. Also, the effect a parameter has on the sound processing can largely depend on the value of other parameters.

Alternative embodiments of self-fitting of the signal processing parameters by the hearing impaired user present the user with a smaller number of meta-parameters. These meta-parameters simultaneously influence a subset of parameters. One example of a meta-parameter could change the time constants of the compression, as well as the knee point and the compression ratio in order to allow the user to adjust how many soft or far-away sounds he would like to hear. This approach reduces the number of parameters and allows the parameters to be more intuitive.

An alternative embodiment automatically generates a modification of the values of the parameters and asks the user for his preference in a given listening situation, for example in the form of an A/B comparison.

In another embodiment the hearing impaired user is asked to make a simple adjustment of the sound by adjusting only the high-frequency and low frequency signal energy in a specific listening situation. These listening situations could be pre-recorded and stored in the phone or the current listening situation could be used. An algorithm would then take the adjustments that the user has made in a set of listening situations and allow estimating the user adjustment in any listening situation. In its most simple form, this algorithm would use an analytic function that maps the listening situation to the signal processing parameters providing data point interpolation and extrapolation. The optimal approximation would be determined by minimizing the difference of the observed adjustments of the user with the estimation provided by the algorithm. Since the adjustments of the user bear a certain amount of statistical variation, over-fitting needs to be avoided in this optimization.

Another embodiment of self-fitting involves the user playing a game on his phone. During the game, sound processed by the hearing loss compensation module of the invention is presented to the user. In order to advance in the game, the user needs to react to this sound input. During game play, the user interacts with the game and thus unknowingly changes the parameters of the signal processing. For example, part of the game could be to react to the information in a speech signal masked by background noise. Or the user would need to react to a voice that is presented at a very soft sound level. The game may also reproduce music, for example in a game in which the user needs to identify one or more music instruments. The game base approach to parameter fitting can provide a benefit in the self-fitting process of children. The game based fitting would produce a range of parameter values that would be fed into the control logic though the same input that the audiologist is using, compare FIG. 5 and FIG. 6.

When compared with state-of the art hearing solutions, the invention is in many ways superior and it differs in various aspects from known solutions.

When looking at a worldwide population of about 600 million hearing impaired, many of these people are struggling with limited financial means and cannot afford conventional hearing solutions, because modern hearing aids, cochlear implants, bone conductive implants and middle ear implants are costly high-tech devices due to the necessity of custom hardware and custom chip development.

In contrast, consumer products with audio processing capabilities are mass-produced and much more affordable. In addition consumer devices like smartphones and thus the device of this invention can benefit from advances in battery life and CPU power that are driven by a competitive consumer goods market. According to the invention, the user can use attractive consumer products like a smartphone or a music player. These devices appeal to most people a lot more than hearing aids and hearing-impaired users will be more willing to use these devices in public.

Whereas most state-of-the-art hearing aids have an upper limit of frequency range of around 8 kHz, consumer audio devices are optimized for music consumption and manufactured for the frequency range of normal hearing users, which is 20 Hz to 20 kHz. Especially people suffering from a mild-to-moderate hearing loss can particularly benefit from this wider frequency range of these devices.

The invention can be easily combined with other technologies (TV, stereo, game console, landline phones, door bells, car audio systems, handheld microphones, etc.) because most consumer devices offer a wide range of integration possibilities. Smartphones for example allow using ear buds, headphones, Bluetooth headsets or an amplified speaker system for acoustic stimulation. Also with respect to sound input, consumer devices are more flexible than hearing solutions. They can receive sound signal via Bluetooth or wireless Internet.

The invention allows the user to control a large number of parameters using the rich user interface, for example the graphical user interface on the touch screen of a smartphone.

This screen also provides detailed feedback to the user, which is not possible with state-of-the-art hearing solutions. The adjustments that the user is doing can be driven by an amplification need in a specific situation, but even more important, the user can start adjustment sessions in which he is presented with recorded acoustic situations and he is asked to adjust the amplification for optimal speech intelligibility, for optimal sound quality or for optimal listening comfort. These adjustments of the user are referred to as "self-fitting". They can directly influence the parameters of the hearing loss compensation module or they can be done as an iterative A/B comparison of parameter sets. If the self-adjustment is repeated in several listening situations, an algorithm can be used to decide on the best parameter set in any given listening situation.

In the case of cochlear implants, rehabilitation and hearing training is very labour intensive and requires typically many hours of support from a hearing professional. The invention can help by mediating remote rehabilitation and remote hearing training between the hearing impaired and the hearing professional. The invention can also execute simple automatic rehabilitation and hearing training tasks, in which the user is interacting with the rich user interface (listen to stimuli, answering questions, etc.). The necessity of carrying out hearing test in the mother tongue of the user is handled by the server, where test material can be provided in multiple languages.

Another advantage of the present invention is that the freely programmable processing unit (see FIG. 3) enables a detailed usage monitoring, based on sensors as the clock, the location sensor and the accelerometer (see the sensor module FIG. 5). This usage monitoring provides very useful data to the audiologist.

State-of-the-art hearing solutions are not able to monitor hearing loss degradation and to alert the audiologist. In contrast, the invention allows observing a change in the usage pattern of the user as well as an increase of the amplification and periodically executing hearing tests, using the sound generating functionality of the programmable processing unit and the rich user interface to interactively test the hearing ability of its user. Using the Internet link to the server, the hearing professional can be notified about changes in the performance of the hearing impaired user.

In the invention the workflow between the hearing impaired user and the hearing professional is more flexible due to the Internet connection of the device. The hearing professional can interact with the hearing impaired users in three manners. Firstly, he can use the rich user interface (see FIG. 3) to directly adjust the device parameters. Secondly, he can change the device settings remotely, using the manual expert input in the external server (see FIG. 8). Thirdly, he can contribute to generate knowledge on the server to provide a better automatic expert input on the server by tweaking the parameters of the expert input model. The expert input model also uses machine-learning algorithm to learn from the adjustments made by a large number of hearing impaired users.

The user can use the Internet connection to upload audio recordings of situation in which he has problems using the device or in which he has problems understanding what is being said. Due to the rich user interface, the user can also annotate these recordings, for example "In this recording I cannot hear what my grandchild is saying". These recordings help the audiologist to better understand the nature of the user's problems. Due to the connection of the device to the server, this type of situation specific interaction between the hearing impaired and the hearing professional is supported over long distances. The possibility of remote hearing support is specifically useful if the number of hearing professionals per inhabitant is low, as in developing countries or in rural areas.

The software (firmware) that runs in state-of-the-art hearing aids is normally not upgradable. For a small number of products, firmware updates may be available, but these updates are not done on a frequent basis and therefore, changes in the signal processing are in most cases limited to parameter-based changes that have been anticipated when the device was built. In contrast, the Internet connection to the server allows regularly updating not only the signal processing parameters, but also the software and algorithms themselves.

Only a small number of hearing aids offer a very simple form of noise based tinnitus masking. In contrast, the present invention implements tinnitus suppression and tinnitus masking in its programmable processing unit, both of which benefit from the storage capacity of the operating system. This allows storing individually selected audio recordings and it also allows the user to himself to record sound environments for tinnitus relief. The already mentioned wide frequency range above 8 kHz is especially useful for tinnitus relief, since tinnitus is often found at frequencies above 8 kHz.

Additionally, the invention allows the input signal to stem from Internet Protocol telephony (VoIP). VoIP uses packet based internet protocol (for example UDP) to send speech data from one Internet device to another. Many VoIP protocols transmit speech in a wider frequency band far beyond the limitation of about 3400 Hz bandwidth for traditional landline phones and 3100 Hz for cell phones. Prior art VoIP telephony does not meet the individual amplification needs of hearing impaired users. The invention can be used to provide VoIP telephony that is easier to understand for hearing impaired users. For this purpose, the VoIP data is taken as input signal, hence replacing the microphone and A/D conversion in FIG. 1. This configuration resembles the application of the invention in the reproduction of music. Any settings that the audiologist or the hearing impaired user had made to the system will be active when listening to the amplified VoIP signal. The outgoing voice signal will not be amplified. The invention is also useful to provide protection from sudden very loud sounds that can result from errors in the data connection. This protection is also useful for normal hearing people.

Another advantage of the flexibility of using a programmable Internet connected device is a low-cost implementation of classroom assistive listening solutions for hearing impaired children. State of the art solutions are often based on frequency modulation (FM) techniques and require additional hardware for the teacher and for each of the pupils. These systems work well, but they are also very costly. Furthermore, FM systems require paying a lot of care to the choice of FM channels in order to avoid interference from e.g. neighbour classrooms. A more simple approach is a sound-field amplification solution that amplifies the teacher's voice above the ambient room noise. However, this solution struggles with the distance to the pupils, reverberation and the acoustic noise in the classroom. Instead, in the invention, the transmission of the audio signal from the teacher to the pupils, from the pupils to the teacher and amongst the pupils can be realized using the wireless Internet connection (WiFi) or Bluetooth or another wireless connection that comes free with the use of a personal communication device. The Internet protocol and the Bluetooth pairing mechanism also allow for easy low-cost out-of-the-box solutions to reduce or even eliminate interference between neighbouring classes.

In the invention the signals from all microphones used are simultaneously processed in the same programmable processing unit (e.g., microphones positions at a distance of only a few millimetres from each other that are intended for simulating a directional microphone or the signal from microphones at the left and right ear). The invention thus allows for the implementation of algorithms that maintain the spatial orientation of the hearing impaired user or to dynamically adjust the loudness balance between the two ears. This joint processing of the signals in the two ears is especially useful in the fitting of hearing aids to users with an asymmetric hearing loss, in which the audiologist can for example limit the maximal difference in loudness between the two sides. Similarly, algorithms that implement multi-microphone beam forming from the microphones that are situated at one ear or in a hand held directional microphone can be used, since all signal processing takes place in a central place. In state-of-the-art hearing support systems, the parameters of the beam forming are normally fixed. For example the sound direction of the target signal is always assumed to be forward. The rich user interface in our invention allows the user to manually adjust the target direction of the beam forming algorithms on a touch screen.

The central signal processing in a single processing unit of the device according to the invention provides a huge benefit in the case of a hybrid fitting of different technologies. For example, when a user wears a hearing aid on one ear and a cochlear implant of the other ear, the loudness perception of the two ears can be balanced or the time of arrival of sound signal can be adjusted in order to help the user to spatially locate incoming sounds by comparing the signal from both ears. The same is true in other combinations, such as in combined Electroacoustic Stimulation or in any other combination of technologies.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A personal communication device arranged to provide general communication functionality and enriched to provide hearing support functionality, said personal communication device comprising an input arranged to receive an audio signal, a programmable processor, and an output that outputs the processed signal, wherein said programmable processor comprises a filter arranged to perform a filtering operation on a digital version of said audio signal in a first signal path configurable by parameter settings;

said programmable processor further having a second signal path in parallel with said first signal path, said second signal path comprising a module that performs a transfer function calculation arranged to receive said digital version of said audio signal and said parameter settings and to determine filter coefficients of said filter based on said parameter settings and said digital version of said audio signal;

said programmable processor being arranged to provide a control logic that calculates and keeps said parameter settings updated based on user preferences, on audiological information and on information about the listening situation, in which said personal communication device is used, expressed in listening situation descriptors obtained via either or both a sound environment analysis of the received audio signal and a sensor of said personal communication device, so that the processor functions as a hearing loss compensation module that outputs a hearing loss compensated signal, thus making said personal communication device suitable for providing both said general communication functionality and said hearing support functionality.

2. The personal communication device as in claim 1, wherein said module that performs a transfer function calculation is arranged to calculate the filter coefficients of said filter.

3. The personal communication device as in claim 1, wherein said module that performs a transfer function calculation is arranged to select a filter coefficient set among a plurality of pre-calculated filter coefficient sets, said selected filter coefficient set matching a transfer function calculated by said module that performs a transfer function calculation.

4. The personal communication device as in claim 1, further comprising a multiplication unit that multiples the signal output by said filter with a value determined in said module that performs a transfer function calculation.

5. The personal communication device as in claim 1, wherein said module that performs a transfer function calculation is arranged to provide detection of a level of said audio signal via a weighted sum between a first and a second level detector, wherein said first level detector has a smaller time constant than said second level detector and wherein the respective weight factors w and 1-w of said first and second level detector depend on a difference in level detected between said first and second level detector, and wherein the level detector output determines a gain in an automatic gain control module in said module that performs a transfer function calculation.

6. The personal communication device as in claim 1, wherein said filter has an output and said programmable processor is further arranged to reduce audible artefacts by adapting a frequency with which said settings of said filter are switched or by interpolating said settings or by signal interpolation at the output of said filter.

7. The personal communication device as in claim 1, wherein said programmable processor is arranged to split said digital version of said audio signal into at least two frequency bands and to split level adjustment on each of said frequency bands.

8. The personal communication device as in claim 1, wherein said programmable processor further comprises a delay that delays said digital version of said audio signal, so that a look-ahead delay is available.

9. The personal communication device as in claim 1, wherein said programmable processor is arranged to determine a digital gain factor that limits an amount of signal clipping and limits acoustic feedback from an acoustic transducer to a microphone.

10. The personal communication device as in claim 1, wherein said control logic is arranged to update said parameter settings upon a change of the listening situation or upon a change in an input to said control logic.

11. The personal communication device as in claim 1, wherein said control logic comprises a module arranged to register user adjustments by a hearing impaired user along with the situation wherein said adjustments are made.

12. The personal communication device as in claim 1, wherein said control logic is arranged to determine said parameter settings based upon a history of changes to said parameter settings made by a hearing impaired user or an audiologist and based on default parameter values.

13. The personal communication device as in claim 12, wherein said control logic is arranged to compare for a current listening situation with a listening situation wherein said parameter values have been set.

14. The personal communication device as in claim 1, wherein said information on use situation obtained via said sensor comprises information on at least one of activity detection, location, and time.

15. The personal communication device as in claim 1, further arranged to establish a connection to a server external to said personal communication device, said connection being configured to send data for user behaviour monitoring.

16. The personal communication device as in claim 15, wherein at least a part of said audiological information is provided from said server.

17. Personal communication device as in claim 15, adapted for receiving information from said server comprising data gathered across a plurality of users.

18. The personal communication device as in claim 1, wherein said control logic is arranged to interact with a speech processor of a cochlear implant.

19. The personal communication device as in claim 1, further arranged to generate a stimulation pattern to be sent to a cochlear implant.

20. The personal communication device as in claim 1, further arranged to broadcast and receive streams of audio signals for use in a classroom situation.

21. Personal communication device as in claim 1, further arranged for mixing a microphone signal with a music stream.

22. Personal communication device as in claim 1, wherein said programmable processor is arranged for simultaneous processing of a plurality of microphone signals.

23. Personal communication device as in claim 1, wherein said parameter settings further determine an amplification of the hearing loss compensated signal.

24. A method for enriching a personal communication device arranged to provide general communication functionality with hearing support functionality, said personal communication device comprising an input that receives an input audio signal, a programmable processor and an output that outputs processed versions of said input audio signal, the method comprising the steps of:

arranging said processor to perform a filtering operation on a digitized version of said input audio signal using filter coefficients that are determined based on parameter settings and on said digitized version of the input audio signal;

arranging said programmable processor to provide control logic that calculates and keeps said parameter settings updated based on information on user preferences, on audiological information and on information about a listening situation, in which said personal communication device is used, expressed in listening situation descriptors and obtained via either or both sound environment analysis of the received audio signal and a sensor of said personal communication device;

wherein said parameter settings are so determined that said programmable processor functions as a hearing loss compensation module that outputs a hearing loss compensated signal, thus making said personal communication device suitable for providing both said general communication functionality and said hearing support functionality.

\* \* \* \* \*